United States Patent

MacLennan

Patent Number: 5,893,105
Date of Patent: Apr. 6, 1999

[54] EXECUTABLE FLOWCHART

[75] Inventor: C. James MacLennan, San Francisco, Calif.

[73] Assignee: Micrografx, Inc., Richardson, Tex.

[21] Appl. No.: 748,092

[22] Filed: Nov. 12, 1996

[51] Int. Cl.[6] .................................................. G06F 17/30
[52] U.S. Cl. ........................ 707/102; 364/147; 395/701; 707/101; 707/102
[58] Field of Search ..................... 345/333, 522, 345/339; 395/701, 682, 353, 800, 164; 364/140, 136, 147; 707/2, 1, 100, 101, 102

[56] References Cited

U.S. PATENT DOCUMENTS

| | | | |
|---|---|---|---|
| 4,742,443 | 5/1988 | Robin et al. | 364/136 |
| 4,831,525 | 5/1989 | Saito et al. | 364/300 |
| 4,860,204 | 8/1989 | Gendron et al. | 364/300 |
| 4,872,167 | 10/1989 | Maezawa et al. | 371/19 |
| 4,941,081 | 7/1990 | Kumar et al. | 364/140 |
| 4,956,773 | 9/1990 | Saito et al. | 364/200 |
| 5,005,119 | 4/1991 | Rumbaugh et al. | 364/200 |
| 5,097,405 | 3/1992 | Sato | 364/140 |
| 5,187,788 | 2/1993 | Marmelstein | 395/700 |
| 5,237,691 | 8/1993 | Robinson et al. | 395/700 |
| 5,301,326 | 4/1994 | Linnett et al. | 395/682 |
| 5,355,482 | 10/1994 | Ohhashi et al. | 395/650 |
| 5,371,851 | 12/1994 | Pieper et al. | 345/507 |
| 5,381,548 | 1/1995 | Matsuo | 395/700 |
| 5,386,569 | 1/1995 | Harada et al. | 395/700 |
| 5,414,847 | 5/1995 | Tsukakoshi | 395/650 |
| 5,452,453 | 9/1995 | Ando et al. | 395/650 |
| 5,459,866 | 10/1995 | Akiba et al. | 395/650 |
| 5,481,740 | 1/1996 | Kodosky | 345/339 |
| 5,485,620 | 1/1996 | Sadre et al. | 395/700 |
| 5,504,917 | 4/1996 | Austin | 345/522 |
| 5,507,030 | 4/1996 | Sites | 395/800 |
| 5,581,759 | 12/1996 | Ohhashi et al. | 364/147 |
| 5,652,909 | 7/1997 | Kodosky | 395/701 |
| 5,706,458 | 1/1998 | Koppolu | 345/353 |

FOREIGN PATENT DOCUMENTS 0661631  7/1995  European Pat. Off. .......... G06F 9/44

OTHER PUBLICATIONS

Prashant Waknis, et al., "A Graphic Programming Environment For Simulation Of Control And Signal Processing Systems," *IEEE Southeastcon '92*, Apr. 12–15, 1992, pp. 447–450.

*Primary Examiner*—Wayne Amsbury
*Assistant Examiner*—Shahid Alam
*Attorney, Agent, or Firm*—Baker & Botts, L.L.P.

[57] ABSTRACT

A system (12) operating on a computer (14) creates an executable flowchart (26). The system (12) includes a constructor (24) that generates objects (28) that define the executable flowchart (26). The objects (28) include a first shape (40) and a second shape (40). A data structure (30) stores information associated with the objects (28). An entity (60) located at the first shape (40) accesses the data structure (30) to accumulate information associated with the first shape (40). The entity (60) advances from the first shape (40) to the second shape (40) to associate at least a portion of the accumulated information with the second shape (40) in response to advancing.

32 Claims, 7 Drawing Sheets

| ENTITY: 60 | | SHAPE: 41 | | LINE: 54 | |
|---|---|---|---|---|---|
| 70 → SHAPES: 40, 41, 42 | 80 → | LINES: 50, 51, 52 | 90 → | LINES: 53 | |
| 71 → LINES: 50, 51 | 81 → | LINES: 51, 52 | 91 → | LINES: 0 | |
| 72 → PATHS: 1, 3 | 82 → | LINES: 50 | 92 → | LINES: 53 | |
| 6 → SUM: 12 | 83 → | PATHS: 1, 2, 3 | 93 → | SHAPES: 43 | |
| 6 → MEAN: 5 | 84 → | PATHS: 2, 3 | 94 → | SHAPES: 44 | |
| 6 → MAXIMUM: 8 | 85 → | PATHS: 1 | 95 → | PATHS: 5 | |
| STARTING SHAPE: 40 | 86 → | WEIGHTS: 0.2, 0,8 | 96 → | DIRECTION: 43/44 | |
| ENDING SHAPE: 44 | 6 → | VALUE: 4 | 97 → | WEIGHT: 1.0 | |
| ... | | ... | 6 → | VALUE: 3 | |
| | | | | ... | |

EXECUTABLE FLOWCHART

TECHNICAL FIELD OF THE INVENTION

This invention relates in general to the field of flowcharting, and more particularly to a system and method operating on a computer for constructing, customizing, and executing an executable flowchart.

BACKGROUND OF THE INVENTION

Many persons use flowcharts to model organizational, functional, hierarchical, chronological, and other suitable relationships according to particular needs. It is often desirable to construct, customize, and follow flowcharts using a computer to increase efficiency, reproducibility, and quality of appearance. For example, a user might construct a flowchart using a computer and then follow the flowchart during a telemarketing contact with a potential customer according to responses of the potential customer to questions from the user.

As requirements for information become increasingly complex and time-sensitive, organizational business tools such as flowcharting applications continue to gain in importance. A known technique for flowchart construction requires the user to author program code, parameters, and other information each time a new or modified flowchart element is added to a flowchart, making such techniques inaccessible to an ordinary user. Furthermore, once this often complicated process is complete, the user is forced to transport the constructed flowchart to an appropriate operating platform to execute the flowchart, drastically reducing the efficiency of the endeavor. Such techniques do not allow the to construct, customize, and execute a flowchart in real time without authoring program code and without transporting between platforms. Moreover, because users cannot readily execute flowcharts constructed using these techniques, users are not likely to obtain benefits of efficiency, reproducibility, organization, and quality of appearance that an executable flowchart can offer in a business or other setting.

SUMMARY OF THE INVENTION

In accordance with the present invention, the disadvantages and problems associated with flowcharting have been substantially reduced or eliminated.

In accordance with one embodiment of the present invention, a system operating on a computer creates an executable flowchart. The system includes a constructor that generates objects that define the executable flowchart. The objects include a first shape and a second shape. A data structure stores information associated with the objects. An entity located at the first shape accesses the data structure to accumulate information associated with the first shape. The entity advances from the first shape to the second shape to associate at least a portion of the accumulated information with the second shape in response to advancing.

Important technical advantages of the present invention include providing a system and method operating on a computer in an object-oriented environment that allows the user to construct an executable flowchart without writing, entering, or otherwise providing program code to control flowchart execution. As a result, flowcharts and their benefits are readily accessible to an ordinary user of the present invention. Furthermore, in stark contrast to previous systems and methods, according to the present invention, flowchart 26 may be constructed, modified if necessary or desirable, and fully or partially executed in real time without transporting between platforms. As the user constructs the flowchart using the constructor, the system 12 simultaneously generates corresponding objects and other associated information and processes to allow the user to execute the flowchart in a straightforward manner as the entity progresses through the flowchart. Another important technical advantage of the present invention is that the modularity inherent in the objects that define the flowchart allows the user to execute one or more selected portions of the flowchart for testing or other purposes without executing the flowchart in full. Other important technical advantages are apparent from the accompanying figures, description, and claims.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION OF THE INVENTION

Figure 1:
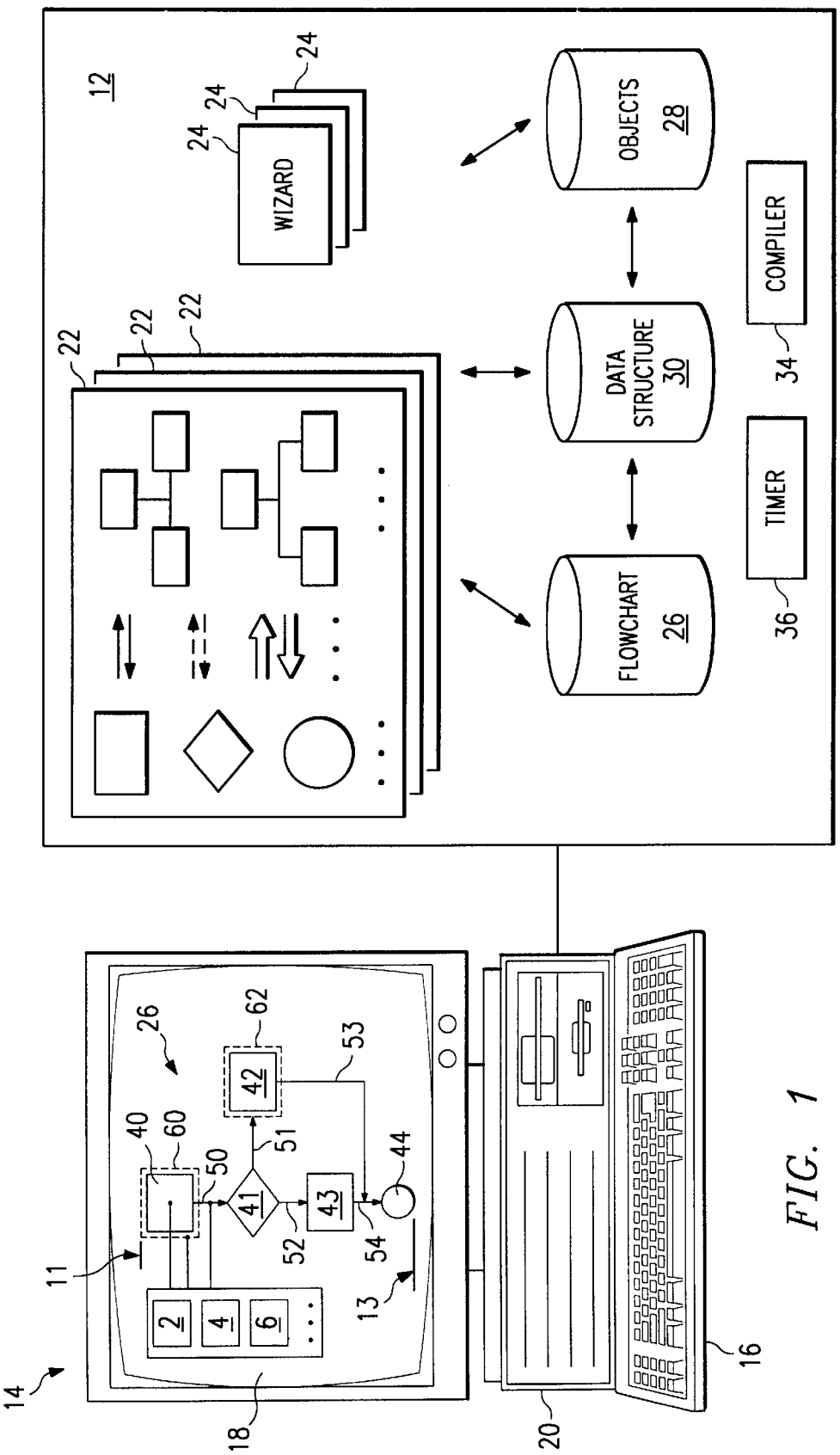
FIG. 1 illustrates an exemplary system operating on a computer for constructing, customizing, and executing an executable flowchart according to the teachings of the present invention.

FIG. 1 illustrates an exemplary system 12 for constructing, customizing, and executing an executable flowchart in an object-oriented environment. System 12 may be operated by one or more persons, computers, or other processing devices suitable to determine, specify, direct, or otherwise control the operation of system 12.

System may operate on one or more computers 14 that includes an input device 16, such as a keypad, touch screen, microphone, or other device to accept information from a user. An output device 18 may convey information associated with the operation of system 12, including digital or analog data, visual information, and audio information, in any suitable combination. In one embodiment, output device 18 includes a graphical user interface (GUI) that presents visual information to the user in accordance with the construction, customization, or execution of the flowchart. Both input device 16 and output device 18 may include fixed or removable storage media, such as magnetic computer disks, CD-ROM, or other suitable media to both receive output from and provide input to system 12. Computer 14 may have a processor 20 and an associated volatile or non-volatile memory to execute instructions and manipulate information in accordance with the operation of system 12.

In one embodiment, system 12 includes one or more palettes 22 and one or more wizard interfaces 24 that are used to construct, customize, or otherwise manipulate an executable flowchart 26 in an object-oriented environment. Palette 22 may appear visually on output device 18 as a box or other enclosed region containing physical shapes, lines, directional indicators, organizational layouts or other functional options, and other suitable flowchart elements or features, with or without accompanying descriptive or other textual information. The physical elements displayed in association with palette 22 correspond to objects 28 and information associated with objects 28 that may be used to construct executable flowchart 26 according to particular needs using wizard interface 24. Flowchart 26, objects 28, and information associated with flowchart 26 and objects 28 may be wholly or partially stored in data structure 30 or other suitable storage location. The features, behaviors, relationships, and other aspects of palette 22, wizard interface 24, flowchart 26, objects 28, and data structure 30 are discussed more fully below. System 12 includes a timer 36 that measures time intervals associated with the execution of flowchart 26.

In one embodiment, objects 28 include one or more entities, one or more shapes, and one or more lines that are related in objectspace according to a hierarchical, functional, or other suitable arrangement. Each object 28 may be represented visually using output device 18 as a physical flowchart element. Each object 28 encapsulates, hides, or otherwise conceals from user 10 and possibly other objects 28 some or all of the structure of the information associated with object 28 and the routines, algorithms, functions, scripts, and other processes that implement actions and other behaviors of object 28. Instead of exposing the often complex implementation and other details of objects 28 to user 10, objects 28 present visual interfaces to user 10 using output device 18 that represent abstractions of objects 28.

For example, and referring to the visual presentation of exemplary flowchart 26 shown on output device 18, an abstraction of a shape 40, 41, 42, 43, or 44 (referred to generally as shape 40) may appear on output device 18 as a rectangle, triangle, diamond, circle, or other flowchart element. Similarly, an abstraction of a line 50, 51, 52, 53, or 54 (referred to generally as line 50) may appear as a straight, curved, solid, dashed, or other physical line suitable to connect visual abstractions of shapes 40 or other lines 50 to one another. Abstractions of entities 60 and 62 (referred to generally as entity 60 and illustrated as a dashed line) may appear during execution of flowchart 26 as a visual cue, such as a solid, shaded, or colored dot or other region, a toggling effect, a size or color change, or any other appropriate indicator of the progress of entity 60 through flowchart 26 during flowchart execution. Alternatively, abstractions of entity 60 may not be apparent on output device 18 during execution of flowchart 26. Instead, the existence or appearance of abstractions of shapes 40 and lines 50 may constitute the visual cue that indicates the progress of entity 60. The present invention contemplates any visual abstraction or other representation of objects 28 suitable to allow the user to construct, customize, and execute flowchart 26 in accordance with particular needs.

Each object 28 may have one or more associated script modules 2, actions 4, and data field values 6, alone or in any combination. For example, shapes 40 incorporated into flowchart 26 may perform one or more actions 4 or other tasks during execution of flowchart 26 that have been previously specified during flowchart construction. The user specifies the order in which shapes 40 perform actions 4 and defines the relationships between shapes 40 as the user draws, drags, places, locates, or otherwise creates visual abstractions of shapes 40 on output device 18 using palette 22 and wizard interface 24. For example, shape 40 having a visual abstraction that resembles a film strip might be associated with a file specified by the user through wizard interface 24 that causes a movie or other audiovisual work to be displayed on output device 18 in response to entity 60 reaching, progressing through, or encountering film strip shape 40. Shape 50 having a visual abstraction resembling a printer might cause a printer specified by the user through wizard interface 24 to print a document in response to entity 60 encountering printer shape 40. Shape 40 having a visual abstraction resembling a dial or gauge might monitor or allow the user to modify parameters, variables, or other information associated with construction or execution of flowchart 26. The present invention contemplates any suitable actions 4 associated with shapes 40, lines 50, or other objects 28.

Each object 28, such as shape 40, may include one or more script modules 2 that operate according to VB Script or other suitable scripting language. In one embodiment, script modules 2 and the associated scripting language allow the user to use object linking and embedding (OLE) techniques to automatically control processes that are external to flowchart 26 using shapes 40. Flowchart 26 may also include a script module 2 and associated scripting language to hold global functions and data, a function that executes automatically in response to loading of flowchart 26, and other suitable functions and other information not associated with any shape 40. In one embodiment, script module 2 associated with shape 40 may intercept appropriate events to allow shape 40 to override particular actions 4 on an individual basis. In a similar manner, script module 2 associated with flowchart 26 may allow flowchart 26 to intercept events to override global and other actions 4 associated with flowchart 26.

A path connects each shape 40 in flowchart 26 to one or more other shapes 40 in flowchart 26 in objectspace. Paths that connect shapes 40 in objectspace also connect visual abstractions of shapes 40 on output device 18 as would be expected from a visual examination of flowchart 26 on output device 18. In one embodiment, system 12 stores various relationships between shapes 40 and the paths that connect shapes 40 in data structure 30 or some other appropriate storage location as the user constructs flowchart 26. The content and arrangement of information associated with shapes 40 and other objects 28 in data structure 30 is discussed more fully below with reference to FIG. 4. Each path that connects shapes 40 includes one or more lines 50 in objectspace and on output device 18. Each line 50 has inherent or specified directionality and connects a shape 40 to the same or a different shape 40, connects a shape 40 to a different line 50, or connects a different line 50 to a shape 40, depending on the construction of flowchart 26. Lines 50 that connect shapes 40 collectively form paths between shapes 40. In one embodiment, some or all paths available to entity 60 at each shape 40 are related visually to buttons or other suitable indicators on output device 18, such that entity 60 progresses along a particular path from shape 40 based on an interpretation of input from the user.

During execution of flowchart 26, one or more entities 60 move, flow, pass, or otherwise progress through shapes 40 and lines 50 according to the construction of flowchart 26. In one embodiment, as entity 60 progresses through visual abstractions of shapes 40 and lines 50, entity 60 may inherit, adopt, accumulate, or otherwise receive data field values 6 and other suitable information associated with shapes 40 and lines 50. In objectspace, entity 60 communicates with other objects 28 and consults data structure 30 and other information storage locations as necessary to proceed with the execution of flowchart 26. As a result, at any point during flowchart execution, for example, at shape 41, entity 60 has access to information such as data field values 6 and path selection information that enables entity 60 to progress through flowchart 26 from shape 41 in a predetermined manner or in response to input from the user, objects 28, or system 12. Flowchart 26 may therefore be fully or partially executed beginning at shape 41 or any other shape 40 or line 50, providing an important technical advantage.

Entities 60, shapes 40, and lines 50 may each be associated with a suitable drawing application, program, or other tool that allows system 12 to present visual abstractions of objects 28 to the user on output device 18. The present invention contemplates objects 28 associated with other suitable applications, programs, or tools that allow system 12 to convey audio, audiovisual, multi-media, and other information to the user in accordance with the execution of flowchart 26.

During the operation of system 12, a communicating object 28, such as shape 41 represented on output device 18, may interact with a receiving object 28, such as shape 42 represented on output device 18, using messages that stimulate the receiving object 28 to perform one or more operations, initiate one or more actions 4, or otherwise react in some manner. For example, shape 42 might send a message to shape 41 to prompt shape 41 or a script module 2 associated with shape 41 to perform a mathematical calculation, modify its appearance on output device 18, or otherwise react to the message from shape 42. The internal information structure and processes for the receiving object 28 may be wholly or partially private to the receiving object 28 or public to the communicating object 28 or other objects 28. For each object 28, data structure 30 includes a listing of other objects 28 that may provide information to, that may receive information from, or that are otherwise connected to object 28 in objectspace.

As discussed more fully below with reference to FIG. 4, data structure 30 also includes a listing of data field values 6 and other information that may be associated with or provided to each object 28 during some or all of the execution of flowchart 26. Objects 28, such as entity 60, consult data structure 30 to access information used to perform actions 4 and communicate information according to the execution of executable flowchart 26. For example, in one embodiment, entity 60 consults data structure 30 each time entity 60 encounters a new shape 40 to determine the available paths that emanate from shape 40 in objectspace and on output device 18. Entity 60 also consults data structure 30 to determine data field values 6 of lines 50 and shapes 40 associated with available paths. Entity 60 is therefore able to accumulate data field values 6 for each shape 40 and line 50 that entity 60 encounters and is also able to select a path from each shape 40 entity 60 encounters to progress through flowchart 26.

For example, entity 60 may select a path leaving shape 40 that has a particular associated data field value 6, a data field value 6 that is within a specified range of data field values 6, or a data field value 6 that satisfies one or more specified conditions, according to input from the user at shape 40. Entity 60 may select a path leaving shape 40 according to a path weight associated with each available path, and may select the path randomly according to the path weight during a simulation or other operation executed using flowchart 26. During the course of a simulation, for example, if three paths leaving shape 40 have corresponding path weights "0.2," "0.5," and "0.3," entity 60 may randomly select the first path approximately twenty percent of the time, randomly select the second path approximately fifty percent of the time, and randomly select the third path approximately thirty percent of the time. System 12 may communicate with objects 28 using events that instruct, control, or otherwise cause objects 28 to perform one or more actions 4 or otherwise respond. One or more start and stop flags 11 and 13, respectively, associated with shapes 40 in flowchart 26 may communicate a beginning, ending, or range of flowchart execution to entity 60 or system 12.

The present invention allows the user to construct an executable flowchart 26 without writing, entering, or otherwise providing program code, as discussed more fully below with reference to FIG. 2 and wizard interface 24. In the past, although a flowchart could be constructed using a drawing application, the user was required to author program code, parameters, and other information each time a new or modified flowchart element was added to the flowchart during construction. Moreover, once this often complicated process was complete, the user was forced to transport the constructed flowchart to an appropriate operating platform to execute the flowchart. In stark contrast, according to the present invention, flowchart 26 may be constructed, modified if necessary or desirable, and fully or partially executed in real time without the user authoring program code and without transporting between platforms. As user 10 constructs flowchart 26 according to particular needs using wizard interface 24, system 12 simultaneously generates corresponding objects 28 and other associated information and processes to allow the user to execute flowchart 26 in a straightforward manner as entity 60 progresses through flowchart 26.

Figures 2, 4:
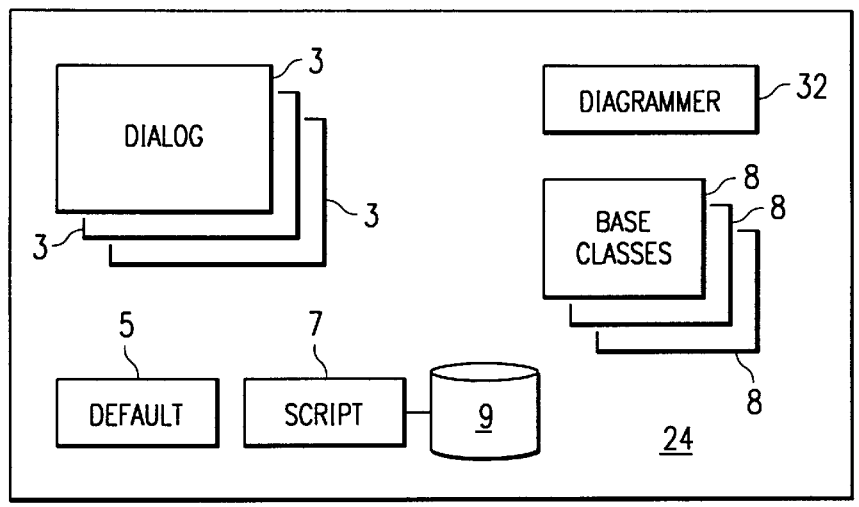
FIG. 2 illustrates an exemplary wizard interface according to the present invention.
FIG. 4 illustrates an exemplary object-oriented data structure.

FIG. 2 illustrates an exemplary wizard interface 24 used to generate objects 28 during flowchart construction. In one embodiment, the user generates, instantiates, or otherwise creates objects 28 and specifies relationships and other information associated with objects 28 using wizard interface 24 or another suitable constructor. In general, wizard interface 24 allows the user to generate objects 28, to specify the behavior of objects 28, and to associate information with objects 28 in constructing, customizing, or otherwise modifying flowchart 26 without writing, authoring, or otherwise providing the program code that directs and controls the execution of flowchart 26 within computer 14.

In one embodiment, as the user generates objects 28 and abstractions of objects 28 during the construction of flowchart 26, a suitable diagrammer application, program, or other tool 32 associated with wizard interface 24 stores information associated with objects 28 in data structure 30 or other suitable storage locations. Wizard interface 24 may include one or more shape, line, entity, or other object base classes 8 from which shapes 40, lines 50, entities 60, and other objects 28 are derived or inherited. In one embodiment, the user uses wizard interface 24 to enter any shape 40 during or after flowchart construction to debug, customize, modify, or otherwise operate on shape 40 according to particular needs. The present invention contemplates the user using wizard interface 24 to enter any shape 40, line 50, or other object 28.

One or more dialog boxes 3 associated with wizard interface 24 may allow the user to provide the information associated with objects 28, such as data field values 6, path identification and selection information, and other suitable information. In addition, wizard interface 24 may have one or more default conditions 5 that generate shapes 40, lines 50, or entities 60 suitable for more commonly used flowchart elements or processes. Moreover, wizard interface 24 and associated dialog boxes 3 may allow the user to directly enter script commands 7, routines, and other program code. Before flowchart 26 is executed, compiler 34 generates program code for controlling the processor of computer 14 in accordance with objects 28 and associated information generated using wizard interface 24 during flowchart construction.

Dialog box 3 associated with wizard interface 24 may prompt the user with text information or otherwise to provide one or more customized script commands 7 to control the manner in which entity 60 navigates flowchart 26. For example, the user may provide script command 7 that determines which path entity 60 will follow from a corresponding shape 40 according to a data field, string, integer, or other variable or parameter 9 associated with script command 7. In one embodiment, a data field parameter 9 for script command 7 will cause selection of a path according to a path weight contained in a data field associated with the path. Similarly, a string parameter 9 will cause selection of a path having the specified string attached to the path or a path ending in shape 40 that contains the specified string. If parameter 9 for script command 7 is an integer, the path specified by the integer will be selected. The present invention contemplates any suitable script commands 7 for accepting various parameters 9 to intelligently determine a path outcome.

Figure 3:
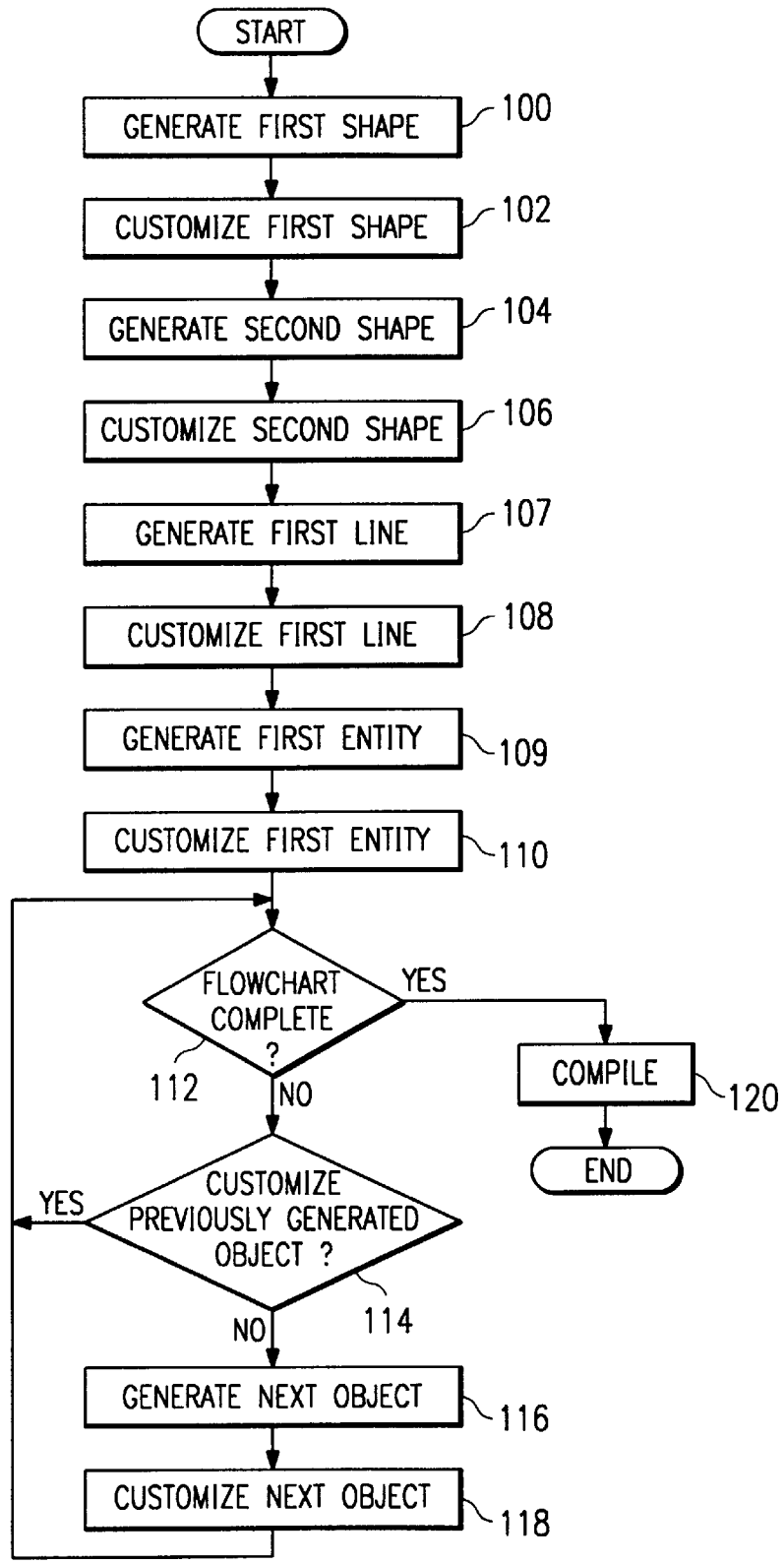
FIG. 3 illustrates an exemplary method performed on a computer for constructing an executable flowchart.

FIG. 3 illustrates a method for constructing an executable flowchart 26 in an object-oriented environment. The method begins at step 100, where the user generates first shape 40 using palette 22, wizard interface 24, or suitable component of system 12. In one embodiment, the user points and clicks, drags and drops, or otherwise selects a first shape 40 from among one or more available shapes 40 associated with palette 22 on output device 18. The selected shape 40 may be presented to the user as a visual abstraction using wizard interface 24. First shape 40 may be derived from and inherit some or all behaviors of a single or multiple shape base class 8 as first shape 40 is incorporated into flowchart 26. In response to the user generating first shape 40, wizard interface 24 or another component of system 12 stores information associated with first shape 40 in data structure 30 for access by lines 50, entities 60, and other objects 28 in flowchart 26. In one embodiment, the information stored in data structure 30 for first shape 40 includes one or more data field values 6 for first shape 40 that entity 60 may accumulate or manipulate in some manner before, during, or after entity 60 reaches first shape 40. First shape 40 may be a starting shape 40 for entity 60 that entity 60 may return to each time the user begins to execute flowchart 26.

At step 102, the user may customize, configure, or modify first shape 40 using wizard interface 24 or another suitable interface according to the particular executable flowchart 26 under construction. For example, the user may use wizard interface 24 and one or more associated dialog boxes 3 on output device 18 to override, supplement, replace, delete, or otherwise modify selected parameters, variables, or other information associated in some manner with first shape 40. Dialog box 3 may visually prompt the user to provide desired textual information, shading, coloring, size information, toggling or other motion information, or any other visual cues, features, and information for association with the visual abstraction of first shape 40 on output device 18. The user may specify data field values 6 or other data or information for association with first shape 40 in data structure 30. In addition, wizard interface 24 may allow the user to associate one or more audiovisual, communications, multimedia, printing, or other actions 4 or behaviors with first shape 40 that occur in response to entity 60 encountering first shape 40 during flowchart execution. Dialog box 3 may prompt the user to provide customized script commands 7 to control the manner in which entity 60 navigates flowchart 26.

The user generates second shape 40 at step 104 and customizes second shape 40 at step 106 in the manner discussed above in connection with first shape object 28. At step 107, the user generates first line 50 using wizard interface 24 or in some other suitable manner to wholly or partially connect first shape 40 and second shape 40. In one embodiment, similar to the generation of first shape 40 and second shape 40 discussed above, the user points and clicks, drags and drops, or otherwise selects a first line 50 from among one or more available physical lines 50 associated with palette 22 on output device 18. First line 50 may be presented as a visual abstraction using wizard interface 24. First line 50 may be derived from and inherit some or all behaviors of a single or multiple line base class 8 as the user incorporates first line 50 into flowchart 26. In response to the user generating first line 50, wizard interface 24 or another suitable component of system 12 stores information associated with first line 50 in data structure 30 for access by first shape 40, second shape 40, entity 60, and other objects 28. In one embodiment, the information stored in data structure 30 for first line 50 includes one or more data field values 6 for first line 50 that entity 60 may accumulate or manipulate in some manner before, during, or after entity 60 reaches first line 50 during flowchart execution.

First line 50 may have an inherent or specified directionality. In one embodiment, the user specifies or otherwise generates an arrow or other suitable indicator available from palette 22 and associates the indicator with the visual abstraction of first line 50 using wizard interface 24. Alternatively, the user may specify the directionality of first line 50 according to the order in which the user associated first line 50 with first and second shapes 40. For example, first line 50 might point from shape 40 the user first indicates in generating first line 50 to shape 40 the user next indicates in generating first line 50. At step 108, the user may customize first line 50 using wizard interface 24 in accordance with the particular executable flowchart 26 under construction. For example, the user may use wizard interface 24 and one or more associated dialog boxes 3 to override, supplement, replace, delete, or otherwise modify selected parameters, variables, or other information associated in some manner with first line 50.

Dialog box 3 may visually prompts the user to provide textual information, shading, coloring, size information, toggling or other motion information, or other visual cues, features, and information for association with the abstraction of first line 50 on output device 18. The user may specify one or more data field values 6 or other information for association with first line 50 in data structure 30. In addition, wizard interface 24 may allow the user to associate audiovisual, communications, multimedia, printing, or other actions or behaviors with first line 40 that occur in response to entity 60 encountering first line 50 during the execution of flowchart 26. In one embodiment, textual information associated with first line 50 includes text associated with a button or other selector associated with the visual abstraction of first shape 40 on output device 28. The user may point and click, touch, or otherwise select the button during flowchart execution in response to a prompt from first shape 40, signaling entity 60 to proceed along the corresponding path and signaling first line 50 to present the textual information to the user after first line 50 is generated.

At step 109, the user generates a first entity 60 using wizard interface 24, palette 22, or other suitable components of system 12. In one embodiment, entity 60 is generated from an entity base class 8 that includes all the routines, variables, and other information necessary to allow entity 60 to progress through flowchart 26 in an expected manner according to the information stored in data structure 30 in association with objects 28 that entity 60 encounters. For example, although the information stored in data structure 30 may vary considerably according to the particular flowchart 26 constructed, the logical processes entity 60 uses to proceed through flowchart 26 may be more or less identical. The user may specify a starting shape 40 for entity 60 that is the same or different than first shape 40 to cause entity 60 to begin executing at starting shape 40 each time flowchart 26 is executed. The user may customize first entity 60 at step 110 in a manner similar to that discussed above with reference to first shape 40, second shape 40, and first line 50.

For example, the user may use wizard interface 24 and one or more associated dialog boxes 3 on output device 18 to override, supplement, replace, delete, or otherwise modify selected parameters, variables, or other information associated in some manner with entity 60. Dialog box 3 may visually prompt the user to provide desired textual information, shading, coloring, size information, toggling or other motion information, or any other visual cues, features, and information for association with the visual abstractions of shapes 40 and lines 50 on output device 18 as entity 60 encounters these objects 28. The user may specify mathematical and other operations entity 60 or associated script module 2 may perform using data field values 6 or other information associated with shapes 40 or lines 50 that entity 60 encounters. In addition, wizard interface 24 may allow the user to associate audiovisual, communications, multimedia, printing, or other actions 4 or behaviors with shapes 40 and lines 50 that occur in response to entity 60 encountering these objects 28 during flowchart execution. Dialog box 3 may prompt the user to provide customized script commands 7 to control the manner in which entity 60 navigates flowchart 26.

In one embodiment, steps 100 through 110 may occur in any suitable order according to the manner in which the user constructs flowchart 26 visually on output device 18. For example, the user may generate any suitable collection of shapes 40 and lines 50 using wizard interface 24 to construct flowchart 26. System 12 may generate one or more entities 60 according to the construction of flowchart 26, before or after construction of flowchart 26 is complete. The user may then execute flowchart 26 in real time, with or without customizing flowchart 26 or any object 28 in flowchart 26 subsequent to construction of flowchart 26 or generation of object 28.

If the user has completed construction of executable flowchart 26 at step 112, compiler 34 compiles flowchart 26 at step 120 and the method ends. The present invention contemplates flowchart 26 being compiled in whole or in part as each object 28 is generated during construction of flowchart 26. Alternatively, if the user has not completed flowchart 26 at step 112, the user may add, delete, replace, or otherwise modify behaviors, visual features, textual information, data field values 6, or other information associated with a previously generated shape 40, line 50, or entity 60 at step 114 to further customize flowchart 26. In one embodiment, the user may customize one or more previously generated objects 28 at any time during construction, customization, or execution of flowchart 26 using wizard interface 24 or other suitable components of system 12, providing an important technical advantage. If the user further customizes a previously generated object 28 at step 114, using wizard interface 24 or otherwise, the method returns to step 112.

If the user does not further customize a previously generated object 28 at step 114, the user generates a next object 28 at step 116 and customizes next object 28 at step 118. Next object 28 may be a next shape 40, in which case next shape 40 is generated and customized in the manner discussed above in connection with steps 104 and 106, respectively. The user may place shape 40 in flowchart 26 on output device 18 at any location relative to previously generated objects 28. For example, referring to flowchart 26 on output device 18 in FIG. 1, the user might have located shape 42 below shape 41, in between shape 40 and shape 41, to either side of shape 41, or in any other suitable location. Regardless of the location of shape 42, entity 60 progresses to and from shape 42 in an expected and straightforward manner according to the relationships specified during flowchart construction between shape 42 and other objects 28 in flowchart 26. The execution of flowchart 26 with respect to shape 42 is determined in accordance with lines 50 and associated paths generated to connect shape 42 to other objects 28 in objectspace and visually on output device 18, which provides an important technical advantage.

Instead of next shape 40, next object 28 might be a next line 50, in which case next line 50 is generated and customized in the manner discussed above in connection with steps 107 and 108, respectively. Next line 50 may be placed in flowchart 26 at any location and with any directionality relative to previously generated objects 28. As discussed above in connection with next shape 40, flowchart execution with respect to next line 50 is specified according to other lines 50 and associated paths generated to connect next line 50 to other objects 28 visually and in objectspace. Next line 50 may connect any previously generated objects 28. For example, next line 50 may connect any shape 40 to the same or any other shape 40 or line 50, may connect any line 50 to any shape 40 or to any other line 50, or may connect any other previously generated objects 28.

At step 118, next object 28 is customized in the manner discussed above in connection with shape 40, line 50, or entity 60, as the case may be. The method continues recursively in this manner until construction of executable flowchart 26 is complete at step 112. As this discussion indicates, the appearance, content, behavior, and other aspects of flowchart 26 are limited only by the needs and imagination of the user, providing an important technical advantage. After compiling at step 120, flowchart 26 is ready for full or partial execution and the method ends. In one embodiment, the user may execute some or all of flowchart 26 from any specified starting shape 40, starting line 50, or other starting object 28 and may cause or allow the execution to proceed to or through any selected ending shape 40, ending line 50, or other ending object 28 due to the modularity that is inherent in the object-oriented environment in which flowchart 26 was constructed.

In one embodiment, starting object 28 and ending object 28 for entity 60 are specified during flowchart construction using wizard interface 24 or otherwise and associated with entity 60 in data structure 30 using a pointer, flag, or indicator accessible to entity 60, other objects 28, flowchart 26, or system 12. Data structure 30 is consulted during flowchart execution to determine if starting object 28 or ending object 28 has been associated with entity 60 and execution of flowchart 26 proceeds or is limited accordingly, as discussed below with reference to FIG. 6. Starting object 28 and ending object 28 may be specified and associated with entity 60 during flowchart construction or customization to allow the user to debug, text, or perform simulations using one or more selected portions of flowchart 26.

FIG. 4 illustrates an exemplary data structure 30 that includes stored information associated with each shape 40, line 50, entity 60, and other object 28 created, instantiated, or generated during the construction of flowchart 26. In one embodiment, objects 28 and system 12 consult data structure 30 at appropriate times during the execution of flowchart 26 to access information that objects 28 then use to perform actions 4, communicate with other objects 28, and otherwise execute in accordance with the construction of flowchart 26. Objects 28 and system 12 may access information in data structure 30 associated with a particular object 28 according to a pointer or other suitable indicator.

For each entity 60 included in flowchart 26, data structure 30 may include, without limitation: a list 70 of shapes 40 through which entity 60 has progressed, a list 71 of lines 50 over which entity 60 has progressed, a list 72 of paths along which entity 60 has progressed, one or more accumulated or other data field values 6 associated with entity 60, a starting shape 40 or other starting object 28 for entity 60, ending shape 40 or other ending object 28 for entity 60, and any other suitable data or other information associated with entity 60. Accumulated data field values 6 may include, for example, and not by way of limitation, a sum, difference, product, quotient, mean, median, maximum, minimum, range, standard deviation, or other manipulation of one or more of data field values 6 associated with shapes 40, lines 50, and other objects 28 that entity 60 has encountered during the execution of flowchart 26.

For each shape 40 included in flowchart 26, data structure 30 may include, without limitation: a list 80 of lines 50 connected to shape 40, a list 81 of lines 50 leaving shape 40, a list 82 of lines 50 entering shape 40, a list 83 of paths connected to shape 40, a list 84 of paths leaving shape 40, a list 85 of paths entering shape 40, a path weight 86 associated with one or more paths connected to shape 40, one or more data field values 6 associated with shape 40, and any other suitable data or other information.

For each line 50 included in flowchart 26, data structure 30 may include, without limitation: a list 90 of other lines 50 connected to line 50, a list 91 of other lines 50 leaving line 50, a list 92 of other lines 50 entering line 50, a list 93 of shapes 40 that line 50 leaves, a list 94 of shapes 40 that line 50 enters, a list 95 of paths including line 50, a directionality indicator 96 associated with line 50, a line weight 97 associated with line 50, one or more data field values 6 associated with line 50, and any other suitable information associated with line 50.

Figure 5:
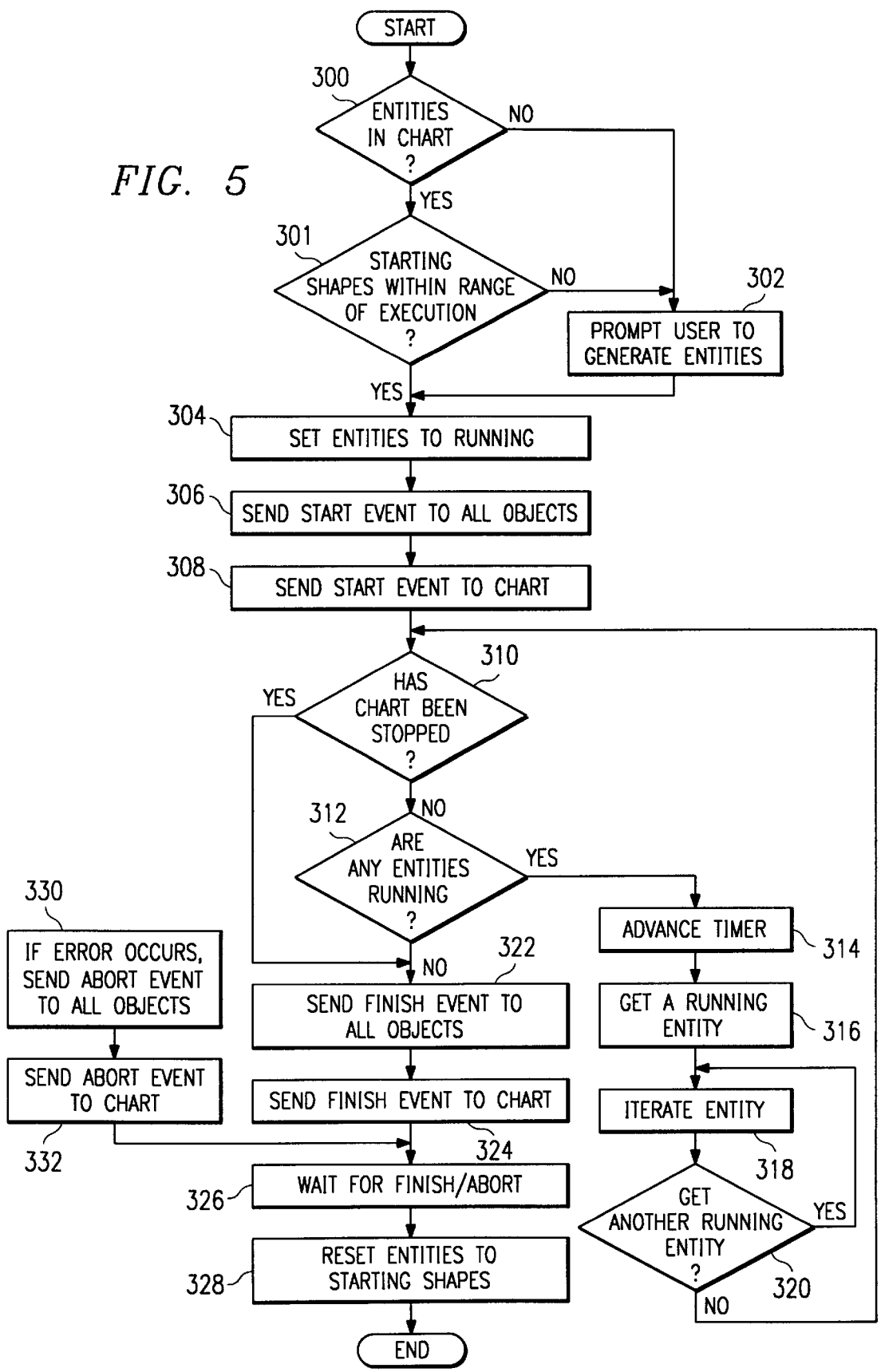
FIG. 5 illustrates an exemplary method of executing a flowchart according to the present invention.

FIG. 5 illustrates an exemplary method of executing flowchart 26 in an object-oriented environment according to the present invention. The method begins at step 300, where a determination is made whether any entities 60 have been incorporated into flowchart 26. If flowchart 26 does not include at least one entity 60 at step 300, system 12 prompts the user visually, audibly, or in some other manner at step 302 to generate one or more entities 60 using palette 22, wizard interface 24, or any other suitable components of system 12. If starting shape 40 associated with each entity 60 is not within a predetermined range of execution at step 303, system 12 prompts the user at step 302 to modify entity 60, starting shape 40, or another suitable parameters associated with flowchart execution. If starting shape 40 is within a predetermined range of execution at step 303, system 12 sets, initiates, or otherwise causes entity 60 to begin running, operating, or executing according to flowchart 26 at step 304.

System 12 communicates a start event at step 306 to some or all objects 28, such as entity 60, shapes 40, lines 50, or other objects 28 to enable objects 28 to communicate with other objects 28 and system 12, consult data structure 30, or otherwise begin executing. At step 308, system 12 communicates a start event to flowchart 26 that is the same as, separate from, in series with, simultaneous with, or in any other suitable relationship with the start event communicated to objects 28 at step 306.

If flowchart 26 has not stopped or otherwise ceased executing at step 310 due to instructions from the user or for any other reason, and at least one entity 60 is still running, operating, or executing according to flowchart 26 at step 312, system 12 advances timer 36 at step 314. At step 316, system 12 gets, retrieves, calls, or otherwise communicates with a running entity 60 using information stored in data structure 30 or elsewhere. At step 318, entity 60 is iterated or otherwise executed in the manner discussed below with reference to FIG. 6. If necessary or desirable before, during, or after entity 60 is iterated at step 318, system 12 may get, retrieve, call, or some other way communicate with the same or a different entity 60 at step 320. Steps 318 and 320 are repeated according to the construction of flowchart 26 until a determination is made at step 320 not to get another entity 60, in which case the method returns to step 310.

If flowchart 26 has stopped or ceased executing at step 310, or if no entities 60 are still running at step 312, system 12 communicates a finish event to some or all objects 28 at step 322. Similarly, at step 324, system 12 communicates a finish event to flowchart 26 that is the same as, separate from, in series with, simultaneous with, or in any other suitable relationship with the finish event communicated to objects 28 at step 322. System 12 waits for objects 28 and flowchart 26 to finish, terminate, or otherwise stop executing at step 326 and, at step 328, resets or otherwise returns some or all entities 60 to starting shapes 40 with which entities 60 are associated in data structure 30. After entities 60 are reset to their corresponding starting shapes 40, the method ends. If an error occurs at any point during the execution of flowchart 26, system 12 may send an abort event to appropriate objects 28 at step 330 to cause objects 28 to terminate or cease executing. Similarly, at step 332, system 12 may send an abort event to flowchart 26 to cause flowchart 26 to terminate or cease executing.

Figure 6:
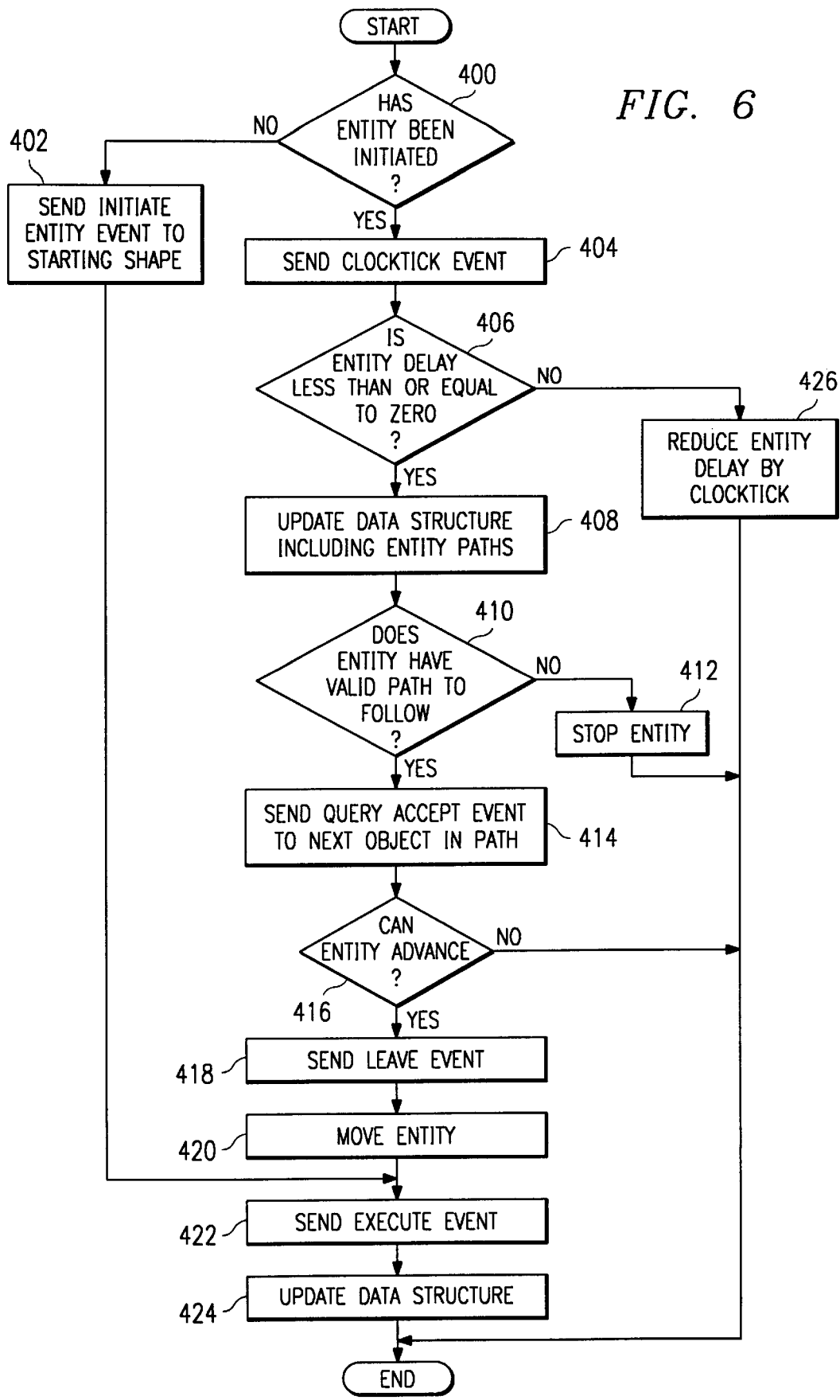
FIG. 6 illustrates an exemplary method of executing an entity according to the present invention.

FIG. 6 illustrates an exemplary method of iterating or otherwise executing entity 60 that has been incorporated into flowchart 26 to allow entity 60 to progress through flowchart 26. The method begins at step 400, where a determination is made whether entity 60 has been set to running or otherwise initiated, as discussed above with reference to FIG. 5. If entity 60 has not been suitably initiated, system 12 communicates an initiate entity event at step 402 to starting shape 40 associated with entity 60, and the method proceeds directly or indirectly to step 422. If entity 60 has been initiated at step 400, system 12 communicates a clocktick event to entity 60, an object 28 that contains entity 60, or another appropriate component of flowchart 26 or system 12 at step 404. At step 406, if a delay function, variable, or other value associated with entity 60 is not less than or equal to zero, system 12 reduces the entity delay value by a clocktick, iteration of entity 60 is complete, and the method ends. In one embodiment, the value of the delay may determine when entity 60 advances during a simulation that flowchart 26 is executing.

If the delay associated with entity 60 is less than or equal to zero at step 406, system 12 updates data structure 30 at step 408 to properly reflect the number, identity, directionality, data field values 6, or any other aspects of one or more paths, each containing one or more lines 50, that entity 60 has progressed along or may progress along according to instructions, responses, or communications from the user or system 12. For example, system 12 may update data structure 30 to reflect changes to one or more accumulated data field values 6 associated with entity 60 as a result of entity 60 progressing along a previous path having an associated data field value 6 to encounter a current shape 40 that is the same as or different from starting shape 40. If system 12 determines that entity 60 does not have any valid paths to progress along at step 410, using information stored in data structure 30 or another suitable indicator, system 12 causes entity 60 to cease executing at step 412, and the method ends. In one embodiment, entity 60 consults data structure 30 to access list 84, which specifies the paths and associated lines 50 available to entity 60.

If at least one valid path exists for entity 60 at step 410, entity 60 or other suitable component of system 12 communicates a query accept event at step 414 to the next object 28 in the path, such as a next line 50, shape 40, or other suitable object 28. If a responsive or other suitable communication from the next object 28 or another component of system 12 indicates that entity 60 can advance to the next object 28 from the current object 28 at step 416, system 12 communicates a leave event to entity 60 at step 418. If entity 60 cannot advance to the next object 28 at step 416, the method ends. In response to the leave event, entity 60 advances from the current object 28 to the next object 28 at step 420. Advancement of entity object 28 from the current object 28 to the next object 28 may appear visually to the user as movement, a temporary change in appearance of the current shape 40, or any other visual cue on output device 18. Before, during, or after entity 60 advances at step 420, entity 60 communicates an execute event at step 422 to an appropriate component of system 12, and the method ends. Entity 60 may accumulate or otherwise manipulate data field values 6 for one or more objects 28 entity 60 advances through, for example, one or more lines 50 within a selected path at any time before, during, or after entity 60 advances between shapes 40 on output device 18, using script modules 2 or otherwise.

Figure 7:
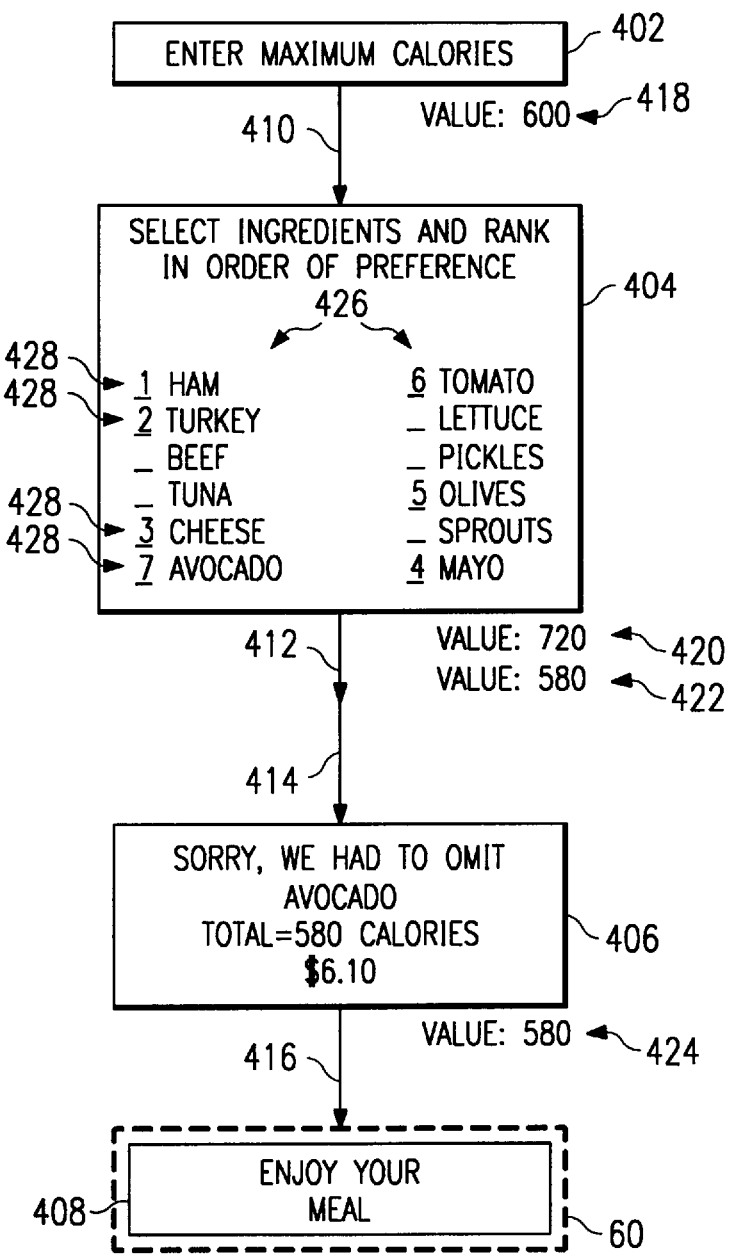
FIG. 7 illustrates an exemplary flowchart.

FIG. 7 illustrates flowchart 400 constructed in accordance with the present invention that includes shapes 402, 404, 406, and 408. Shapes 402, 404, 406, and 408 include textual and other information appropriate for flowchart 400 and specified using wizard interface 24 during flowchart construction. In one embodiment, shape 404 includes a list of ingredients 426 and ranks 428 that are associated with ingredients 426.

Exemplary data field value information 418, 420, 422, and 424 is associated with entity 60 in response to entity 60 encountering shape 402, shape 404, shape 404, and shape 406, respectively, but may or may not be visible to the user on output device 18. Shape 408 may have an associated action 4 that plays audible music to the user in response to entity 60 encountering shape 408. Lines 410, 412, 414, and 416 connect shapes 402, 404, 406, and 408 visibly on output device 18 and in objectspace. Entity 60 is shown in association with shape 408 after flowchart 400 has been fully or partially executed and entity 60 has encountered all objects 28 in flowchart 400 previous to shape 408. The execution, features, and other aspects of flowchart 400 are discussed more fully below.

Figure 8:
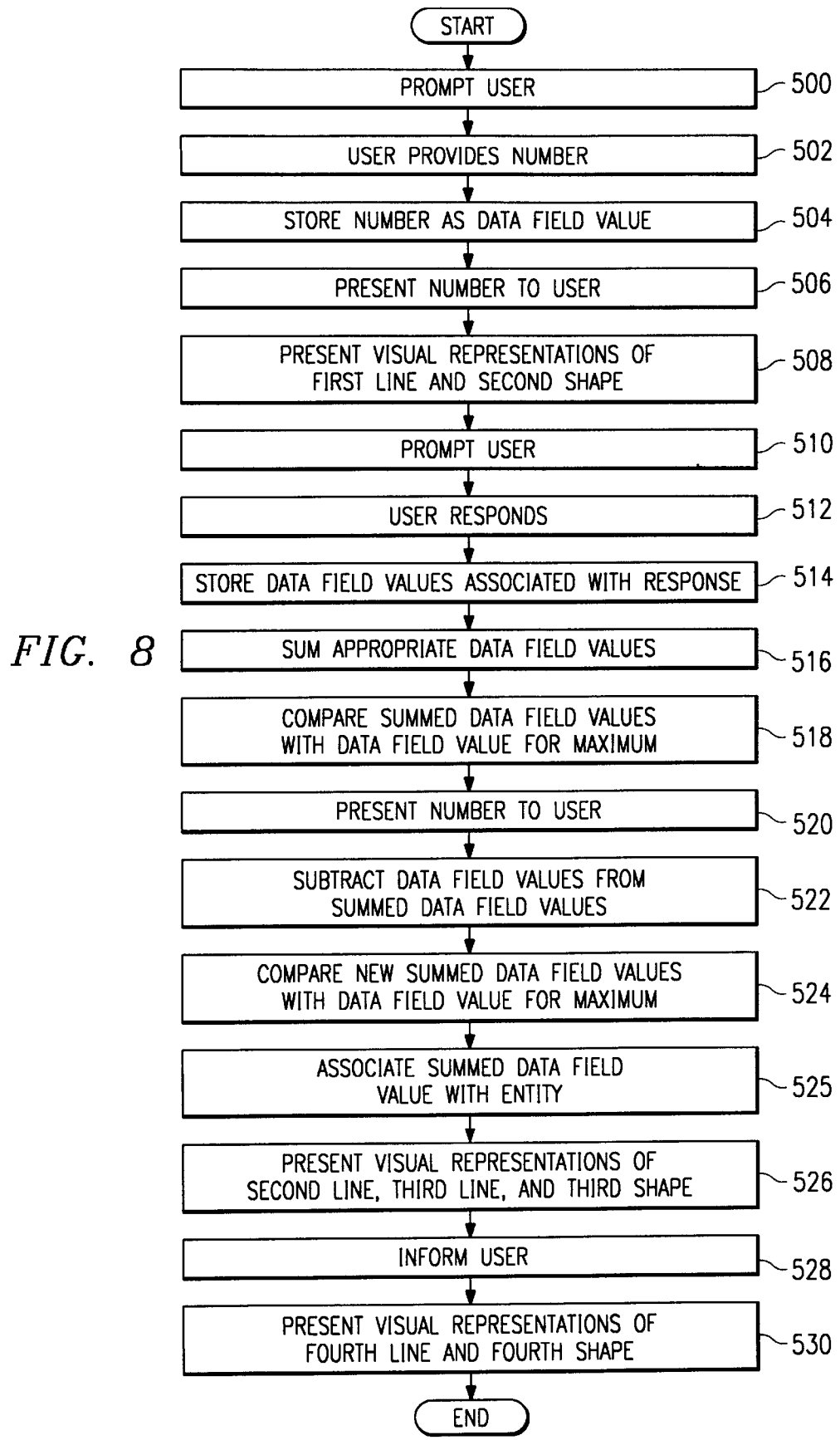
FIG. 8 illustrates a method for executing an exemplary flowchart.

FIG. 8 illustrates a method for executing flowchart 400 illustrated in FIG. 7 according to the teachings of the present invention. In the example discussed, flowchart 400 guides the dieting user through the process of selecting ingredients 426 for a sandwich when flowchart 400 is executed. The method begins at step 500, where shape 402 prompts the user to enter a maximum number of calories for the sandwich. In one embodiment, shape 402 is the starting shape 40 for entity 60 as indicated by information stored in data structure 30. Execution of flowchart 400 would begin elsewhere if shape 402 was not the starting shape for entity 60. At step 502, the user provides the requested information, for example, "600". System 12 may prompt the user to reenter the requested information if the user provides a number that is invalid for any reason, for example, by generating a suitable audible, visual, or other error signal. In response to the user providing the requested information, system 12 stores the maximum calorie number "600" in data structure 30 at step 504 as a data field value 6 associated with shape 402, entity 60, or both shape 402 and entity 60. In one embodiment, system 12 associates maximum calorie data field value 6 with entity 60 in data structure 30 at step 505 for manipulation and comparison with data field values 6 associated with other objects 28 after further advancing through flowchart 400. Maximum calorie data field value 6 may be presented to the user as textual information 418 at step 506.

At step 508, also in response to the user providing the number "600" at step 502, line 410 and shape 404 are temporarily highlighted or first presented to the user on output device 18. System 12 builds flowchart 400 on output device 18 in this manner as the user provides information for association with entity 60 at each shape 40. In one embodiment, shape 404 includes textual information that prompts the user at step 510 to select one or more ingredients 426 and to rank selected ingredients 426 in order of preference. Shape 404 consults, accesses, or otherwise receives maximum calorie data field value 6 and any other suitable data field values 6 associated with entity 60, shape 402, or both entity 60 and shape 402 in data structure 30 as entity 60 advances from shape 402 to shape 404 over a path that includes line 410. As entity 60 advances through flowchart 400, objects 28 that entity 60 encounters can determine information associated with one or more previous shapes 40, such as shape 402, using data structure 30, which reflects data field values 6 and other information entity 60 accumulates.

At step 512, the user provides the requested selection and ranking information as illustrated in FIG. 7 or in any other suitable manner. In one embodiment, ingredients 426 each have associated data field values 6 corresponding to the specified rank, the calories, the price, and any other suitable information associated with the particular ingredient 426. In response to the user selecting and ranking ingredients 426 at step 512, the rank, calorie, and price data field values 6 associated with each selected ingredient 426 are stored in data structure 30 at step 514 in association with entity 60, shape 404, or both entity 60 and shape 404. Script module 2 associated with shape 404 sums the calorie and price data field values 6 for selected ingredients 426 at step 516 and, at step 518, compares the summed calorie data field value 6 with the maximum calorie data field value 6 previously stored in data structure 30. For example, the summed calorie data field value 6 for the selected ingredients 426 shown in FIG. 7 might be "720" and may be presented to the user at step 520 as textual information 420 on output device. The present invention contemplates shape 404 performing other mathematical and other suitable operations involving these or other data field values 6 for selected ingredients 426.

Script module 2 associated with shape 404 manipulates data field values 6 in the manner specified during the construction of flowchart 400. If the summed calorie data field value 6 generated at step 516 exceeds the stored maximum calorie data field value 6 for selected ingredients 426, script module 2 may perform a subtract action at step 522 to subtract the calorie and price data field values 6 for the lowest ranked selected ingredient 426 from the summed calorie and price data field values 6, respectively, to generate new summed data field values 6. At step 524, script module 2 compares the new summed calorie data field value 6 with the maximum calorie data field value 6 previously stored in data structure 30. The new summed calorie data field value 6 might then be "580" and may be presented to the user at step 524 as textual information 422 on output device 18. Shape 404 and associated script module 2 may continue to repeat steps 522 and 524 in this manner until the summed calorie data field value 6 does not exceed the maximum calorie data field value 6 when these data field values 6 are compared at step 524.

In the exemplary execution of this discussion, script module 2 of shape 404 subtracted data field values 6 for only one ingredient, avocado, before the summed calorie data field value 6 of "580" did not exceed the maximum calorie data field value 6 of "600" at step 524. In response to shape 404 completing the performance of these actions, system 12 associates the summed calorie data field value 6 with entity 60 in data structure 30 at step 525. At step 526, line 412, line 414, and shape 406 are temporarily highlighted or first presented to the user on output device 18. As shown in FIG. 7, line 412 and line 414 were generated during construction of flowchart 400 to connect shape 404 and shape 406, although a single line 50 may have been adequate under the circumstances. However, execution of flowchart 400 from the perspective of the user is unchanged as a result of this design choice, that is, flowchart 400 executes as the ordinary user would expect according to the arrangement of objects 28 on output device 18 and responses of the user.

At step 528, textual information associated with shape 406 informs the user of the subtraction of avocado from the list of ingredients 426 selected at step 512, of the total calories for the sandwich, and of the total price for the sandwich. In one embodiment, entity 60 encountering shape 406 causes shape 406 to consult data structure 30 to access these data field values 6 and other information. As entity 60 continues to advance through flowchart 400, data field values 6 may be accumulated in data structure 30 for entity 60 at each shape 40, line 50, or other object 28 that entity 60 encounters. Depending on the location of entity 60, system 12 and other objects 28 can access data field values 6 and other information accumulated as entity 60 advances to allow system 12 and objects 28 to manipulate this information according to construction of flowchart 400 by the user.

Textual information 424 indicates the summed calorie data field value 6 associated with shape 406, and may or may not be visible to the user on output device 18. At step 530, after a predetermined time period or in response to information from the user or another suitable trigger, line 416 and shape 408 are temporarily highlighted or first presented to the user on output device 18. As indicated by dashed lines 430, shape 408 performs or executes an action 4 at step 532 in response to entity 60 reaching shape 408. Action 4 may be to provide audible, visual, or other information, such as a musical jingle, to the user. Entity 60 may or may not accumulate additional data field values 6 in advancing from shape 406 to shape 408. According to the accumulation of data field values 6 and advancement of entity 60, data structure 30 may include a complete record of information that the user provided to system 12, the operations performed on that information by shapes 40 and associated script modules 2, and any other information of interest to the user or others. After, presentation of visual representations of line 416 and shape 408 at step 530, the method ends.

Although the present invention has been described above in connection with several embodiments, it should be understood that a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A system operating on a computer for creating an executable flowchart, the system comprising:
   a constructor operable to generate a plurality of objects that define the executable flowchart, the plurality of objects comprising:
   a first shape; and
   a second shape;
   a data structure for storing information associated with the objects; and
   an entity located at the first shape, the entity operable to access the data structure to accumulate information associated with the first shape, the entity further operable to advance from the first shape to the second shape and to associate at least a portion of the accumulated information with the second shape in response to advancing.

2. The system of claim 1, wherein the constructor comprises a wizard interface operable to allow a user to generate the objects without providing program code.

3. The system of claim 1, wherein the information associated with the first shape comprises input of a human user, the entity advancing in response to the input.

4. The system of claim 1, wherein the accumulated information comprises a data field value.

5. The system of claim 1, wherein the system is operable to associate the accumulated information with the second shape in the data structure in response to the entity advancing to the second shape.

6. The system of claim 1, wherein the second shape is operable to manipulate at least some of the accumulated information in response to the entity advancing to the second shape.

7. The system of claim 1, wherein the system is operable to provide a human user with a visual indication of the location of the entity during execution of the flowchart.

8. The system of claim 1, further comprising a second entity operable to advance through the flowchart.

9. The system of claim 8, wherein the entity and the second entity advance through the flowcart at different rates.

10. The system of claim 1, wherein the system is operable to update the data structure with path information for the entity and to communicate to the entity that a path exists to the second shape, the entity advancing to the second shape in response.

11. The system of claim 1, wherein the system is operable to prompt a human user to provide input, the system further operable to advance the entity to the second shape in response to receiving input from the human user.

12. A flowchart for executing on a computer, the flowchart comprising.

a first shape;

a second shape coupled to the first shape; and an entity located at the first shape, the entity operable to access a data structure to accumulate information associated with the first shape, the entity further operable to advance from the first shape to the second shape and to associate at least a portion of the accumulated information with the second shape in response to advancing.

13. The flowchart of claim 8, wherein the information associated with the first shape comprises input of a human user, the entity advancing in response to the input.

14. The flowchart of claim 12, wherein the accumulated information comprises a data field value.

15. The flowchart of claim 12, wherein the flowchart is operable to associate the accumulated information with the second shape in the data structure in response to the entity advancing to the second shape.

16. The flowchart of claim 12, wherein the second shape is operable to manipulate at least some of the accumulated information in response to the entity advancing to the second shape.

17. The flowchart of claim 12, further comprising a visual cue indicating the location of the entity to a human user during execution of the flowchart.

18. The flowchart of claim 12, further comprising a second entity operable to advance through the flowchart.

19. The flowchart of claim 18, wherein the entity and the second entity advance through the flowchart at different rates.

20. The flowchart of claim 12, wherein the flowchart is operable to update the data structure with path information for the entity and to communicate to the entity that a path exists to the second shape, the entity advancing to the second shape in response.

21. The flowchart of claim 12, wherein the flowchart is operable to prompt a human user to provide input, the flowchart further operable to advance the entity to the second shape in response to receiving input from the human user.

22. A method performed on a computer for executing a flowchart, the method comprising:

generating a plurality of objects to construct the flowchart, the plurality of objects comprising:
a first shape;
a second shape coupled to the first shape; and
an entity located at the first shape;

storing information associated with the first shape in a data structure;

accessing information associated with the first shape in the data structure using the entity;

accumulating information associated with the first shape using the entity;

advancing the entity from the first shape to the second shape; and associating at least a portion of the accumulated information with the second shape.

23. The method of claim 22, wherein the objects are generated using a wizard interface without a user providing program code.

24. The method of claim 22, further comprising the steps of:

receiving input from a human user; and associating the input with the first shape, the entity advancing in response to the input.

25. The method of claim 22, wherein the accumulated information comprises data field value.

26. The method of claim 22, wherein the accumulated information is associated with the second shape in the data structure in response to advancing the entity to the second shape.

27. The method of claim 22, further comprising the step of manipulating at least some of the accumulated information at the second shape in response to advancing the entity to the second shape.

28. The method of claim 22, further comprising the step of providing a human user with a visual cue to indicate the location of the entity during execution of the flowchart.

29. The method of claim 22, wherein generating the plurality of objects further comprises generating a second entity operable to advance through the flowchart.

30. The method of claim 29, wherein the entity and the second entity advance through the flowchart at different rates.

31. The method of claim 22, wherein advancing the entity from the first shape to the second shape comprises:

updating the data structure with path information for the entity; and communicating to the entity that a path exists to the second shape, the entity advancing to the second shape in response.

32. The method of claim 22, further comprising:

prompting a human user to provide input;

receiving the input; and advancing the entity from the first shape in response to receiving the input.

* * * * *